US010492192B2

(12) United States Patent
Liu et al.

(10) Patent No.: US 10,492,192 B2
(45) Date of Patent: Nov. 26, 2019

(54) PDCCH LINK ADAPTATION IN CARRIER AGGREGATION

(71) Applicant: Telefonaktiebolaget LM Ericsson (publ), Stockholm (SE)

(72) Inventors: Qingchao Liu, Ottawa (CA); Guoqiang Lu, Kanata (CA); Edward Mah, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/568,402

(22) PCT Filed: Apr. 21, 2015

(86) PCT No.: PCT/IB2015/052919
§ 371 (c)(1),
(2) Date: Oct. 20, 2017

(87) PCT Pub. No.: WO2016/170389
PCT Pub. Date: Oct. 27, 2016

(65) Prior Publication Data
US 2018/0160400 A1 Jun. 7, 2018

(51) Int. Cl.
*H04W 72/04* (2009.01)
*H04W 16/32* (2009.01)
(Continued)

(52) U.S. Cl.
CPC ......... *H04W 72/042* (2013.01); *H04L 1/0001* (2013.01); *H04L 1/0038* (2013.01);
(Continued)

(58) Field of Classification Search
CPC . H04W 72/0446; H04W 84/12; H04W 84/18; H04W 28/04; H04W 28/06
(Continued)

(56) References Cited

U.S. PATENT DOCUMENTS 8,665,763 B2 * 3/2014 Choi .................. H04W 52/143
370/252
2012/0230211 A1 9/2012 Sandberg et al.
(Continued)

FOREIGN PATENT DOCUMENTS

WO 2014003616 A1 1/2014

OTHER PUBLICATIONS

Author Unknown, "Technical Specification Group Radio Access Network; Evolved Universal Terrestrial Radio Access (E-UTRA); Physical layer procedures (Release 12)," Technical Specification 36.213, Version 12.0.0, 3GPP Organizational Partners, Dec. 2013, 186 pages.
(Continued)

*Primary Examiner* — Gbemileke J Onamuti
*Assistant Examiner* — Sanjay K Dewan
(74) *Attorney, Agent, or Firm* — Withrow & Terranova, PLLC

(57) ABSTRACT

Systems and methods for improved Physical Downlink Control Channel (PDCCH) Link Adaptation (LA) in carrier aggregation are disclosed. A method of operation of a radio access node includes transmitting multiple control messages to the wireless device via PDCCHs associated with corresponding serving cells of the wireless device, informing the wireless device of data transmissions to be transmitted to the wireless device via Physical Downlink Shared Channels of the corresponding serving cells and concurrently operating multiple Physical Uplink Control Channel (PUCCH) receivers on one serving cell during a Transmit Time Interval during which feedback from the wireless device indicative of reception of the data transmissions is expected, where each PUCCH receiver is capable of receiving a different format PUCCH message if necessary. The method also includes updating an outer loop LA parameter for each of the
(Continued)

PDCCHs based on the determined PDCCH transmission status.

21 Claims, 10 Drawing Sheets

(51) Int. Cl.
| | | |
|---|---|---|
| *H04W 72/14* | (2009.01) | |
| *H04L 5/00* | (2006.01) | |
| *H04W 52/12* | (2009.01) | |
| *H04W 52/32* | (2009.01) | |
| *H04L 1/00* | (2006.01) | |
| *H04L 1/16* | (2006.01) | |
| *H04W 52/40* | (2009.01) | |

(52) U.S. Cl.
CPC ............ *H04L 5/001* (2013.01); *H04L 5/0053* (2013.01); *H04L 5/0055* (2013.01); *H04W 16/32* (2013.01); *H04W 52/12* (2013.01); *H04W 52/325* (2013.01); *H04W 72/0446* (2013.01); *H04W 72/14* (2013.01); *H04L 1/1607* (2013.01); *H04W 52/40* (2013.01)

(58) Field of Classification Search
USPC ......................................................... 370/336
See application file for complete search history.

(56) References Cited

U.S. PATENT DOCUMENTS

| | | | |
|---|---|---|---|
| 2013/0288738 A1* | 10/2013 | Takeda | ................. H04L 1/1825 455/522 |
| 2013/0308491 A1 | 11/2013 | Jiang | |
| 2013/0315093 A1 | 11/2013 | Jiang | |

OTHER PUBLICATIONS

Fan, Yong et al., "Efficient Control Channel Resource Allocation for VoIP in OFDMA-Based Packet Radio Networks," EURASIP Journal on Wireless Communications and Networking, vol. 2011, Issue 1, Article ID 712658, Feb. 28, 2011, Hindawi Publishing Corporation, pp. 1-11.

NSN et al., "R1-142432: HARQ-ACK bits ordering for PUCCH format 1b with channel selection," 3rd Generation Partnership Project (3GPP), TSG-RAN WG1 Meeting #77, May 19-23, 2014, 3 pages, Seoul, Korea.

Samsung, "R1-121603: Performance Aspects for Multi-Cell CSI Reporting," 3rd Generation Partnership Project (3GPP), TSG RAN WG1 #68bis, Mar. 26-30, 2012, 3 pages, Jeju, Korea.

International Search Report and Written Opinion for International Patent Application No. PCT/IB2015/052919, dated Jan. 5, 2016, 15 pages.

* cited by examiner

PDCCH LINK ADAPTATION IN CARRIER AGGREGATION

This application is a 35 U.S.C. § 371 national phase filing of International Application No. PCT/IB2015/052919, filed Apr. 21, 2015, the disclosure of which is incorporated herein by reference in its entirety.

TECHNICAL FIELD

The present disclosure relates to a control channel outer loop adjustment for control channel link adaptation (LA) in a cellular communications network.

BACKGROUND $3^{rd}$ Generation Partnership Program (3GPP) Long Term Evolution (LTE) and LTE-Advanced (LTE-A) standards are developed to meet growing capacity demands due to rapid expansion of wireless data services. One challenging aspect of these standards is the optimal usage of limited radio resources shared by multiple wireless devices. Specifically, the Physical Downlink Shared Channel (PDSCH) is designed to carry downlink data, and the Physical Uplink Shared Channel (PUSCH) is designed to carry uplink data, while the Physical Downlink Control Channel (PDCCH) is designed to carry Downlink Control Information (DCI) in each subframe to provide wireless devices with necessary scheduling information in terms of resource allocation, modulation and coding scheme information, and power level information for proper downlink data reception and/or uplink data transmission. The terms DCI and PDCCH are sometimes used interchangeably when there is no confusion.

In current LTE standards, there are several DCI formats including DCI formats 0 and 3 for uplink (UL) and DCI formats 1 and 2 for downlink (DL). A DCI carrying DL scheduling information is also called a DL assignment and a DCI carrying UL scheduling information is called a UL grant. The information of each DCI is rate matched and scrambled with a cell-specific and slot-specific scrambling sequence. One wireless device could have one or more DCIs in the same subframe. Each DCI is carried on one or more control channel elements (CCEs) depending on DCI length and DL radio channel condition. The number of CCEs used is often called the CCE aggregation level, which can be 1, 2, 4, or 8. An aggregation level larger than 1 means DCI payload is repeated over more than one CCE, resulting in a lower code rate, which is often needed for wireless devices in poor radio channel conditions.

PDCCH Link Adaptation (LA) intends to choose an optimal CCE aggregation level and power for each DCI for each wireless device based on the DL channel condition of the wireless device. If the channel condition is good, a small number of CCEs (a low CCE aggregation level) and/or a low transmit power may be used. Otherwise, a large number of CCEs and a high transmit power may be used. The number of control symbols available to be used for PDCCH is limited. As such, the number of available CCEs for each subframe, which are shared by all the wireless devices serviced by a network node, is also limited. That means the performance of PDCCH LA may greatly impact the LTE network performance by affecting factors such as capacity and the number of wireless devices served by a network node.

As an example, in the case of Voice over Internet Protocol (VoIP), which demands a large number of DCIs, PDCCH capacity may be a key limiting factor for VoIP capacity. If PDCCH LA is too aggressive by using a small number of CCEs for each wireless device and/or a low transmit power for each wireless device in order to support as many wireless devices as possible within each subframe, wireless devices may have more PDCCH decoding failures, meaning some wireless devices may fail to locate the related DL data sent through the physical downlink shared channel (PDSCH) or may miss UL grants for PUSCH transmission. This may result in significant throughput reduction and/or reduced user satisfaction. On the other hand, if PDCCH LA is too conservative by using a large number of CCEs or a high transmit power for each wireless device, the number of wireless devices that can be accommodated within each subframe will be smaller, which may lead to a low VoIP capacity, which is especially unacceptable in VoIP applications. As such, good PDCCH LA design is important.

The DL channel condition used in the PDCCH LA for a wireless device is based on the Channel Quality Indicator (CQI), which is determined by the wireless device and reported to the network node through UL channels such as PUSCHs or Physical Uplink Control Channels (PUCCHs). The network node will use CQI reports to estimate Signal-to-Interference-plus-Noise ratio (SINR), which, together with a target PDCCH block error rate (BLER), is used to determine PDCCH LA. This is referred to as a pure CQI report based PDCCH LA. Accurate and timely CQI reports will help the network node adjust the CCE aggregation level and transmit power. Unfortunately, accurate and timely CQI reports may be difficult to obtain due to these limitations: (a) CQI reporting cannot be too frequent, as its reporting interval is limited by signaling overhead; (b) CQI reporting accuracy may vary from one wireless device to another depending on wireless device specific implementation; (c) often, each wireless device derives its CQI by checking cell-specific reference signals, which may not necessarily take into account the interference on PDCCH regions or PDSCH resource blocks. As such, there is a strong need for an additional adjustment on the CQI reported from the wireless device. This additional adjustment is referred to as an outer loop adjustment. The outer loop adjustment done for control channel LA, e.g., for the PDCCH LA, is referred to as control channel outer loop adjustment. Similarly, there is also an outer loop adjustment done for the data channel LA, e.g., for the PDSCH LA, and that is referred to as data channel outer loop adjustment. PDCCH LA outer loop operates based on the feedback the network node receives from the wireless device about the PDCCH transmission results. A feedback indicating a failed transmission will move the outer loop output in a direction that will result in more conservative coding and/or higher power in PDCCH transmission, and a successful transmission will move the outer loop output in the opposite direction. However, in Carrier Aggregation (CA), the network node sometimes receives ambiguous feedbacks from the wireless device. That is, the network node cannot decide whether the previous PDCCH transmission was a success or a failure. As a result, the PDCCH LA outer loop is not able to function effectively when the wireless device operates in CA mode. Thus there is a need to develop new methods to tackle this problem.

SUMMARY

Systems and methods for improved Physical Downlink Control Channel (PDCCH) Link Adaptation (LA) in Carrier Aggregation (CA) are disclosed. In some embodiments, a method of operation of a radio access node in a cellular communications network to provide improved PDCCH LA when serving a wireless device according to a CA scheme is provided. The method includes transmitting multiple control messages to the wireless device via PDCCHs associated with corresponding serving cells of the wireless device. The control messages inform the wireless device of corresponding data transmissions to be transmitted to the wireless device. The method also includes transmitting the data transmissions to the wireless device via Physical Downlink Shared Channels (PDSCHs) of the corresponding serving cells and concurrently operating multiple Physical Uplink Control Channel (PUCCH) receivers on one serving cell during a Transmit Time Interval (TTI) during which feedback from the wireless device indicative of reception of the data transmissions is expected, where each PUCCH receiver is capable of receiving a different format PUCCH message. The method also includes ways of determining the PDCCH transmission status based on the multiple PUCCH receivers' operation results and updating an outer loop LA parameter for each of the PDCCHs based on the PDCCH transmission status.

In some embodiments, transmitting the data transmissions to the wireless device via the PDSCHs associated with the corresponding serving cells comprises transmitting the data transmissions in the same TTI.

In some embodiments, updating the outer loop LA parameter for each of the PDCCHs includes determining that none of the PUCCH receivers received feedback from the wireless device indicative of reception of any of the data transmissions and, in response to determining that none of the PUCCH receivers received feedback from the wireless device, updating the outer loop LA parameter for each of the PDCCHs.

In some embodiments, updating the outer loop LA parameter for each of the PDCCHs in response to determining that none of the PUCCH receivers received feedback from the wireless device includes decrementing the outer loop LA parameter for each of the PDCCHs by a corresponding predefined down-step value.

In some embodiments, updating the outer loop LA parameter for each of the PDCCHs includes determining that one of the PUCCH receivers received feedback indicative of reception of at least one of the data transmissions; and, in response to determining that one of the PUCCH receivers received feedback, determining a transmission status for each of the control messages transmitted to the wireless device using the PDCCHs where the transmission status is either a successful transmission, a failed transmission, or an unknown transmission status and updating the outer loop LA parameter for the PDCCHs based on the transmission status for each of the control messages transmitted to the wireless device using at least one of the PDCCHs.

In some embodiments, updating the outer loop LA parameter for each of the PDCCHs based on the transmission status for each of the control messages includes, for each PDCCH, incrementing the outer loop LA parameter by a predefined up-step value if the transmission status for the control message transmitted to the wireless device using the corresponding PDCCH is a successful transmission and decrementing the outer loop LA parameter by a predefined down-step value if the transmission status for the control message transmitted to the wireless device using the corresponding PDCCH is a failed transmission.

In some embodiments, updating the outer loop LA parameter for the PDCCHs based on the transmission status for each of the control messages also includes, for each PDCCH, refraining from updating the outer loop LA parameter if the transmission status for the control message transmitted to the wireless device using the corresponding PDCCH results in unknown transmission status. In some embodiments, transmitting the data transmissions to the wireless device includes transmitting only one data transmission to the wireless device on one serving cell in a TTI; and determining the transmission status for the control messages transmitted to the wireless device using the PDCCHs includes, in response to determining that one of the PUCCH receivers received feedback, determining that the transmission status of the PDCCH corresponding to the only one data transmission is a successful transmission; and, in response to determining that the expected PUCCH receiver did not receive feedback, determining that the transmission status of the PDCCH corresponding to the only one data transmission is a failed transmission.

In some embodiments, only one data transmission of the data transmissions to the wireless device is on a secondary cell; and determining the transmission status for each of the control messages transmitted to the wireless device using the PDCCHs includes, in response to determining that one of the PUCCH receivers received a format 3 PUCCH message, determining that the transmission status of the PDCCH of the secondary cell is a successful transmission; in response to determining that one of the PUCCH receivers received a format 1a/b PUCCH message, determining that the transmission status of the PDCCH of the secondary cell is a failed transmission; and, in response to determining that none of the PUCCH receivers received feedback, determining that the transmission status of the PDCCH of the secondary cell is a failed transmission.

In some embodiments, the method also includes transmitting at least one data transmission to the wireless device such that the transmission status of the at least one corresponding control message is never an unknown transmission status. In some embodiments, this includes determining a starting subframe for a scheduling window and a duration of the scheduling window, beginning at the starting subframe of the scheduling window, transmitting at least one data transmission to the wireless device such that the transmission status of the at least one corresponding control message is never an unknown transmission status; and, until the duration of the scheduling window has elapsed, continuing to transmit at least one data transmission on different serving cells to the wireless device using the corresponding PDCCH such that the transmission status of the at least one corresponding control message on different serving cells is never an unknown transmission status.

In some embodiments, transmitting the at least one data transmission also includes determining a periodicity of the scheduling window and repeating the transmitting step and the continuing to transmit step according to the periodicity of the scheduling window.

In some embodiments, transmitting the at least one data transmission includes, for each serving cell, determining an amount of time that has elapsed since its PDCCH LA outer loop was last updated and, if the amount of time that has elapsed is greater than a predefined threshold, transmitting at least one data transmission to the wireless device such that the transmission status of the control message on that serving cell is never an unknown transmission status.

In some embodiments, the predefined threshold is chosen in order to balance the throughput of the data transmissions to the wireless device and a desired accuracy of the outer loop LA parameter.

In some embodiments, transmitting the at least one data transmission to the wireless device such that the transmission status of the at least one corresponding control message is never an unknown transmission status includes transmitting only one control message on one serving cell to the wireless device informing the wireless device of a corresponding data transmission to be transmitted to the wireless device on that serving cell. In some embodiments, only one of the at least one control message to the wireless device is on a secondary cell.

In some embodiments, the outer loop LA parameter is used to choose a Control Channel Element (CCE) aggregation level and/or a power level for transmission of the control message to the wireless device using the corresponding PDCCH.

In some embodiments, each control message is a Downlink Control Information (DCI). In some embodiments, a first one of the PUCCH receivers is capable of receiving a format 1a/b PUCCH message, and a second one of the PUCCH receivers is capable of receiving a format 3 PUCCH message.

In some embodiments, the serving cells include multiple cells controlled by the radio access node such that each of the PDCCHs and the corresponding PDSCH are on a corresponding cell of the multiple cells. In some embodiments, at least one of the serving cells is a cell provided by a remote radio head controlled by the radio access node. In some embodiments, the cellular communications network is a Long Term Evolution (LTE) network.

In some embodiments, a radio access node is adapted to transmit control messages to a wireless device via a corresponding plurality of PDCCHs associated with corresponding serving cells, informing the wireless device of corresponding data transmissions to be transmitted to the wireless device; transmit the data transmissions to the wireless device via PDSCHs associated with the corresponding serving cells; concurrently operate multiple PUCCH receivers on one serving cell during a TTI during which feedback from the wireless device indicative of reception of the data transmissions is expected, where each PUCCH receiver is capable of receiving a different format PUCCH message; and update an outer loop LA parameter for each of the PDCCHs based on an output from the PUCCH receivers.

In some embodiments, a radio access node for use in a cellular communications network includes at least one processor and a memory coupled to the at least one processor. The memory contains instructions executable by the at least one processor whereby the radio access node is operative to transmit control messages to a wireless device via corresponding PDCCHs associated with corresponding serving cells, informing the wireless device of corresponding data transmissions to be transmitted to the wireless device; transmit the data transmissions to the wireless device via PDSCHs associated with the corresponding serving cells; concurrently operate multiple PUCCH receivers on one serving cell during a TTI during which feedback from the wireless device indicative of reception of the data transmissions is expected, where each PUCCH receiver is capable of receiving a different format PUCCH message; and update an outer loop LA parameter for each of the PDCCHs based on an output from the PUCCH receivers.

In some embodiments, a radio access node includes a control message transmission module operative to transmit control messages to a wireless device via corresponding PDCCHs associated with corresponding serving cells, informing the wireless device of corresponding data transmissions to be transmitted to the wireless device; a data transmission module operative to transmit the data transmissions to the wireless device via PDSCHs associated with the corresponding serving cells; a PUCCH receiver module operative to concurrently operate multiple PUCCH receivers on one serving cell during a TTI during which feedback from the wireless device indicative of reception of the data transmissions is expected, where each PUCCH receiver is capable of receiving a different format PUCCH message if necessary and to determine the transmission status of each of the plurality of PDCCH transmissions based on the decoding results of the plurality of PUCCH receivers; and a LA module operative to update an outer loop LA parameter for each of the PDCCHs based on an output from the PUCCH receivers.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments.

Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
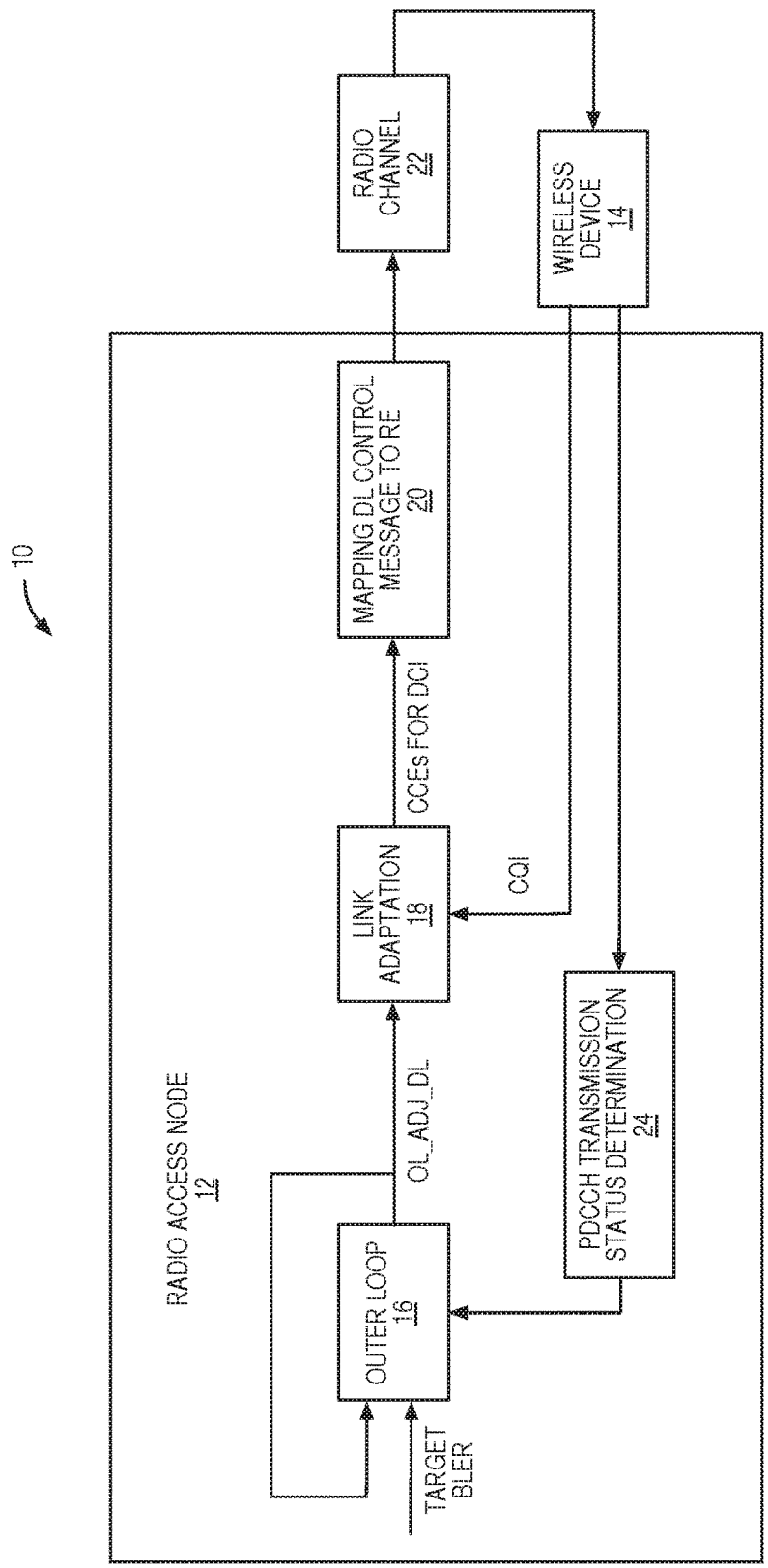
FIG. 1 is a diagram depicting an exemplary cellular communications network for communications between a radio access node and a wireless device.

Before discussing the embodiments of the current disclosure, an exemplary cellular communications network 10 for communications between a radio access node 12 and a wireless device 14 (referred to herein as wireless device 14 or wireless devices 14) is discussed. In this regard, FIG. 1 illustrates a cellular communications network 10 including a radio access node 12 that uses improved physical downlink control channel (PDCCH) Link Adaptation (LA) in Carrier Aggregation (CA) according to some embodiments of the present disclosure. The radio access node 12 is, in general, any node in a radio access network of the cellular communications network 10. In some embodiments, the radio access node 12 is a base station (e.g., an evolved or enhanced Node B (eNB) in a Long Term Evolution (LTE) network). The wireless device 14 may be any type of wireless device enabled to communicate with the radio access node 12. In LTE, the wireless device 14 may be referred to as a User Equipment device (UE). While only one wireless device 14 is illustrated in FIG. 1, there may be any number of wireless devices 14 served by the radio access node 12. Notably, much of the discussion herein focuses on embodiments in which the cellular communications network 10 is a $3^{rd}$ Generation Partnership Project (3GPP) Long Term Evolution (LTE) cellular communications network. As such, 3GPP terminology is oftentimes used herein. However, while the embodiments described herein focus on 3GPP LTE, the embodiments and concepts disclosed herein may be used in any suitable type of existing or future cellular communications network including for example, 3G networks (e.g. Universal Mobile Telecommunications System (UMTS)), 4G networks (WiMAX, LTE, LTE-A), and 5G or other future networks where feedback bundling is used.

The radio access node 12 in FIG. 1 may configure wireless device 14 to receive downlink signals from more than one cell simultaneously, where each cell may use a different carrier frequency to carry a downlink signal which is called CA. A CA capable wireless device may be configured to receive downlink signals from more than one cell but send uplink signals back to one cell only. A cell with which a wireless device initially established a communication and to which the wireless device is sending an uplink signal is called the primary cell (PCell) for the wireless device, while a cell sending an additional downlink signal to the wireless device is called a secondary cell (SCell) for the wireless device. Because of this imbalance between downlink capabilities and uplink capabilities, Hybrid Automatic Repeat Request (HARQ) feedback may be bundled in a CA mode of operation. When a wireless device 14 is configured to receive data from more than one carrier, the uplink signal sent from the wireless device 14 to the PCell may include at least one of downlink CQI report, and HARQ Acknowledgement (ACK) and/or Negative Acknowledgement (NACK) feedback for the PCell and for at least one SCell.

To address the limitations in the pure Channel Quality Indicator (CQI) report based Physical Downlink Control Channel (PDCCH) LA, each cell may include an outer loop adjustment block to determine a control channel outer loop adjustment for a wireless device 14. This is illustrated in FIG. 1, where radio access node 12 includes an outer loop adjustment block 16 that is used to determine a control channel outer loop adjustment (OL_ADJ_DL) for wireless device 14. The outer loop adjustment OL_ADJ_DL is added to a PDCCH Signal-to-Interference-plus-Noise Ratio (SINR) estimate based on CQI reports for the cell. The resultant SINR estimate is used by the link adaptation 18 to determine the required Control Channel Element (CCE) aggregation level and transmit power as discussed above.

The DL control messages are then mapped to the CCEs in the mapping DL control message to Resource Element (RE) block 20 and transmitted from the radio access node 12 to the wireless device 14 over a downlink radio channel 22. The downlink radio channel 22 is the medium through which radio signals corresponding to a downlink transmission propagate from the radio access node 12 to the wireless device 14. The downlink radio channel 22 can be characterized in many ways, including by characterizing the relationship between the radio signal transmitted by the radio access node 12 and the radio signal received by the wireless device 14. In some embodiments, if the characteristics of the downlink radio channel 22 are favorable for correctly receiving the transmitted radio signals, the quality of the downlink radio channel 22 is considered good.

Figure 2:
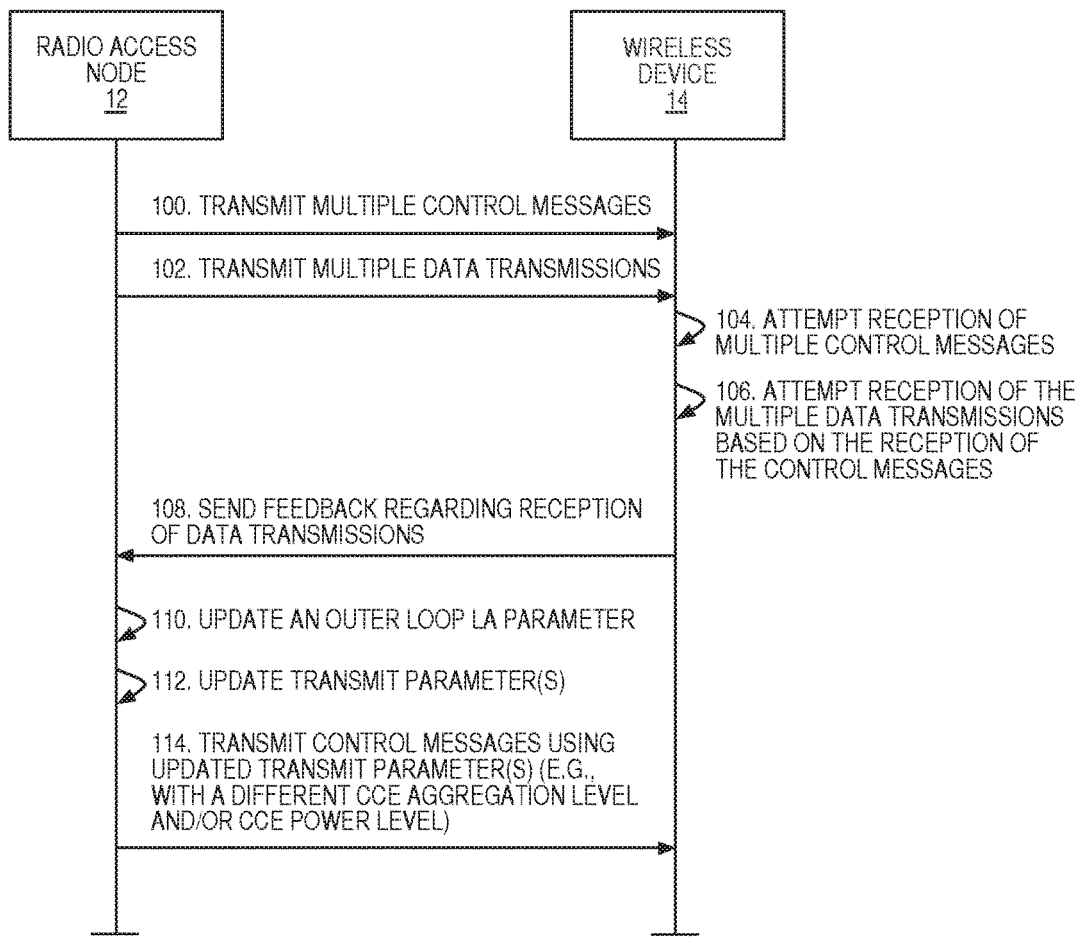
FIG. 2 illustrates a procedure of performing a control channel outer loop adjustment for a wireless device at a radio access node.

The wireless device 14 transmits uplink signals to the radio access node 12. The received uplink signal from the wireless device 14 contains at least one of CQI reports, HARQ ACK/NACK feedback, and uplink data. The CQI report is fed to link adaptation 18, where the CQI is used to estimate SINRs for PDCCH and PDSCH. PDCCH transmission status determination block 24 examines any uplink data and/or a HARQ feedback signal in an attempt to determine if one or more PDCCH transmissions were received by the wireless device 14. As discussed in more detail below, there are instances when the status of a PDCCH transmission is known to be received and others where the status of the PDCCH transmission is known to be not correctly received. There are other instances when the transmission status is unknown due to an ambiguity in the received signals. The results from the PDCCH transmission status determination block 24 are fed to outer loop adjustment block 16 to update the value of control channel outer loop adjustment for control channel link adaptation. FIG. 2 illustrates a procedure of performing a control channel outer loop adjustment for a wireless device 14 at a radio access node 12. In this example, the radio access node 12 transmits multiple control messages to the wireless device 14 (step 100). In some embodiments, these may be multiple PDCCH messages scheduling multiple downlink data transmissions for multiple cells in a CA mode of operation. The radio access node 12 then transmits multiple downlink data transmissions to the wireless device 14 (step 102). The wireless device 14 attempts reception of the multiple control messages (step 104). Some or all of the control messages may be correctly received, while the others may not be correctly received. If the wireless device 14 correctly received one or more of the control messages in step 104, then the wireless device 14 may be anticipating one or more of the downlink data transmissions. As such, the wireless device 14 attempts reception of the multiple downlink data transmissions based on the reception of the control messages (step 106). The wireless device 14 then sends feedback regarding the reception of the downlink data transmissions to the radio access node 12 (step 108). In some embodiments, the feedback will be an ACK if a downlink data transmission was received correctly and a NACK if a downlink data transmission was not received correctly. Either one of these feedback results may indicate that the corresponding control message was correctly received. As discussed above with regard to CA, if the wireless device 14 must report feedback for multiple downlink data transmissions, then the wireless device may bundle those feedback values or use a different feedback mechanism that allows multiple feedback values to be sent at the same time.

After receiving the feedback from the wireless device 14, the radio access node 12 updates an outer loop LA parameter (step 110). In some embodiments, this outer loop LA parameter is for a specific cell and the radio access node 12 may update multiple outer loop LA parameters for multiple cells. The radio access node 12 then uses the updated outer loop LA parameter to update one or more transmit parameters such as CCE aggregation level and transmit power level (step 112). For the next transmission to the wireless device 14, the radio access node 12 transmits control messages using the updated parameter(s) to the wireless device 14 (step 114).

Updating the outer loop LA parameter(s) upon receiving feedback from the wireless device 14 may be challenging when the wireless device 14 is operating in a CA mode of operation. For instance, CA poses a serious challenge for PDCCH LA, as in CA, it is not always possible based on HARQ feedback to distinguish between an instance in which PDCCH successfully transmitted the downlink assignment DCI, but the corresponding PDSCH was not decoded, i.e., a NACK on the PDSCH and an instance in which the PDCCH carrying the downlink DCI was not decoded successfully by the wireless device 14.

In some embodiments, CA is a LTE-Advanced technology introduced in Release 10 of the 3GPP standard. Each aggregated carrier is called a component carrier (CC) which can have any of the Release 8 bandwidths: 1.4, 3, 5, 10, 15, 20 MHz. Up to 5 CCs can be aggregated to give a maximum of 100 MHz bandwidth. In the aggregated cells, only one cell can be the primary cell (PCell) which handles Radio Resource Control (RRC) connection. The other cells are called secondary cells (SCell) and their CCs called secondary CCs (SCC). Both the PCell and the SCells are called the serving cells of the wireless device 14. With CA, in each serving cell, the wireless device 14 can receive 1 or 2 transport blocks (TBs) in the downlink (DL) in a subframe depending on the transmission mode configured in that cell. The wireless device 14 will generate either an ACK or a NACK for each TB in each serving cell. These decoding results (called HARQ bits) will be sent back to the radio access node 12 either on the PCell's PUCCH channel or PUSCH channel. For HARQ bits sent on the PUCCH channel, either PUCCH format 1b with channel selection (CS) and/or PUCCH format 3 can be used depending on the capability of the wireless device 14. Specifically:

In Frequency Division Duplexing (FDD) for wireless devices 14 which can do CA with at most 2 CCs, PUCCH format 1 b with CS is used when configured with an SCell.

In FDD for wireless devices 14 which can do CA with 3 or more CCs, either PUCCH format 1b with CS or PUCCH format 3 can be used when the wireless device 14 is configured with more than 1 serving cell (i.e., as long as the wireless device 14 is capable of aggregating 3 or more cells, PUCCH format 3 still can be used with 2 aggregated cells).

In Time Division Duplexing (TDD) for wireless devices 14 which can do CA with 2 or more CCs, either PUCCH format 1b with channel selection or PUCCH format 3 can be used.

Ambiguities exist in determining the PDCCH transmission success or failure based on HARQ feedback in CA. For example, when using PUCCH format 1b with CS for HARQ feedback of 2 CC CA in FDD, the following table from the 3GPP technical standard 36.213 shows the ambiguity in the HARQ feedback. This is Table 10.1.2.2.1-3: Transmission of Format 1 b HARQ-ACK channel selection for A=2.

TABLE 1

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No Transmission | |

As an example of a possible ambiguity, in the $3^{rd}$ row of Table 1, the HARQ feedback for PCell is ACK, and the HARQ feedback for the SCell is either NACK or DTX. In other words, when the radio access node 12 detected values on PUCCH resource $n_{PUCCH,0}^{(1)}$ b(0) b(1) of 1,1, for PCell, the PDCCH transmission is a success. But for SCell, it could either mean that the PDCCH transmission was a success but the PDSCH was not decoded (hence NACK), or it could mean that the PDCCH transmission was a failure (hence DTX).

Similarly, for PUCCH format 3, there could also be ambiguities. In the following example, four HARQ bits are received on PUCCH with format 3. Specifically, two carriers were scheduled and the values 0010 were received, shown in Table 2. The last two bits, 1,0 mean that on the SCell, the PDCCH transmission is successful with TB1 as ACK and TB2 as NACK. But for PCell, the first two HARQ bits 00 could either mean that the PDCCH transmission is a success (but both TB failed to decode on PDSCH, i.e., NACK) or the PDCCH transmission on PCell was a failure, i.e., the wireless device 14 did not detect any DCI on PCell.

TABLE 2

| 0 | 0 | 1 | 0 |
|---|---|---|---|
| NACK/DTX | NACK/DTX | ACK | NACK |

PDCCH transmission success or failure will result in the PDCCH outer loop moving in opposite directions. As such, any ambiguity on the transmission result may lead to incorrect PDCCH outer loop operation.

Some ways of dealing with this ambiguity include running a PDSCH LA outer loop and adding an offset value to achieve PDCCH LA. This approach relies on the fact that the channel conditions for PDCCH and PDSCH are similar, which may not always be true. For instance, the PDSCH channel and the PDCCH channel may be using different time-frequency resources and will more than likely experience different channel conditions. Plus the PDSCH will have different BLER target that the PDCCH. The offset value is a static one and can be difficult to set properly. A too conservative offset value will result in lowered PDCCH capacity, and a too aggressive offset value will result in a high PDCCH BLER rate.

A more severe problem may occur when the very first PDCCH transmission on an SCell is a failure. In that case, the PDSCH on the SCell will never get started (since the scheduling was not received by the wireless device), and the PDSCH LA outer loop will never run. Then, if the PDCCH LA outer loop is tied to the PDSCH LA outer loop, the PDCCH LA outer loop will not get updated to increase the CCE aggregation level and/or the CCE power level, and the wireless device may remain at Discontinuous Transmission (DTX) on the SCell.

Another way of dealing with the ambiguity is, for a wireless device running applications such as Voice over Internet Protocol (VoIP) (sometimes referred to as Voice over LTE (VoLTE) in LTE) requiring a tighter control on PDCCH, the radio access node may simply stop scheduling on SCells (effectively disabling CA) to eliminate the feedback ambiguity on the PCell. This results in lowered data throughput and may negatively impact user experience.

Also, for a wireless device configured with PUCCH format 3 in FDD, if the wireless device fails to detect transmission on its SCells, the wireless device will fall back to report HARQ feedback on PUCCH format 1a/b although the radio access node had scheduled on multiple carriers. The radio access node configured with PUCCH format 3 receiver will get DTX on both PCell and SCells resulting in zero PCell throughput and perhaps eventually dropping the wireless device unless the wireless device gets out of DTX on at least one of the SCells.

Figure 3:
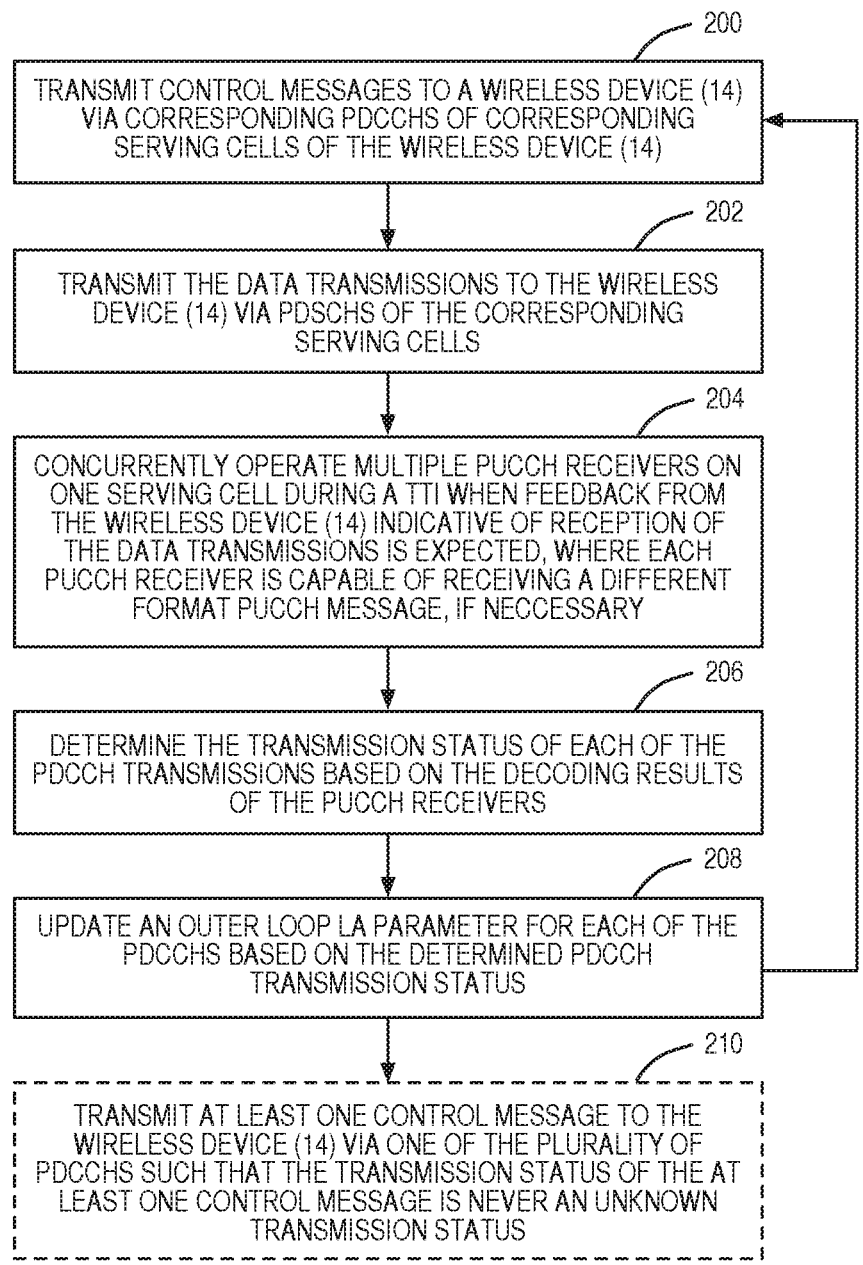
FIG. 3 illustrates the operation of a radio access node for performing a control channel outer loop adjustment for link adaptation when serving a wireless device according to a Carrier Aggregation (CA) scheme according to some embodiments of the present disclosure.

To address this and other problems discussed previously, FIG. 3 illustrates the operation of a radio access node 12 for performing a control channel outer loop adjustment for LA when serving a wireless device 14 according to a CA scheme according to some embodiments of the present disclosure. First, the radio access node 12 transmits control messages to a wireless device 14 via corresponding PDCCHs of corresponding serving cells of the wireless device 14 (step 200). In some embodiments, the control messages may contain scheduling information for downlink data transmissions on the corresponding serving cells. Next, the radio access node 12 transmits the data transmissions to the wireless device 14 via PDSCHs of the corresponding serving cells (step 202). Note that both control messages and data transmissions are sent in the same TTI. Describing these two using two steps is just for convenience of description.

Depending on which, if any, of the control messages were properly received by the wireless device 14, the wireless device 14 may send feedback indicative of reception of the data transmissions, such as HARQ feedback. As discussed above, there may be times when the radio access node 12 expects the feedback to be transmitted in a specific format, such as PUCCH format 3, but the wireless device instead sends the feedback using a different format, such as PUCCH format 1a/b. As such, the radio access node 12 may concurrently operate multiple PUCCH receivers on one serving cell during a TTI when feedback from the wireless device 14 indicative of reception of the data transmissions is expected (step 204). Each PUCCH receiver is capable of receiving a different format PUCCH message. The radio access node 12 determines the transmission status of each of the PDCCH transmissions based on decoding results of the plurality of PUCCH receivers (step 206). A transmission status may be success, failure, or an unknown transmission status. The radio access node 12 then updates an outer loop LA parameter for the PDCCH channel based on the PDCCH transmission status in that TTI (step 208). This includes the PDCCH transmissions, each of which was the only PDCCH transmission on all the serving cells of the wireless device 14 in a specific TTI. This also includes the PDCCH transmissions, each of which was the only PDCCH transmission on all the SCells of the wireless device 14. In some embodiments, an outer loop LA parameter for a PDCCH may be increased if the radio access node 12 determines that the control message sent on that PDCCH was correctly received by the wireless device 14. In some embodiments, the outer loop LA parameter for the PDCCH may be decreased if the radio access node 12 determines that the control message sent on that PDCCH was not correctly received by the wireless device 14. In some embodiments, the outer loop LA parameter for the PDCCH may not be changed if the transmission status for the control message transmitted to the wireless device 14 using the PDCCH is an unknown transmission status. In some embodiments, the radio access node optionally transmits at least one control message to the wireless device 14 via one of the PDCCHs such that the transmission status of the at least one control message is never an unknown transmission status (step 210).

Figure 4:
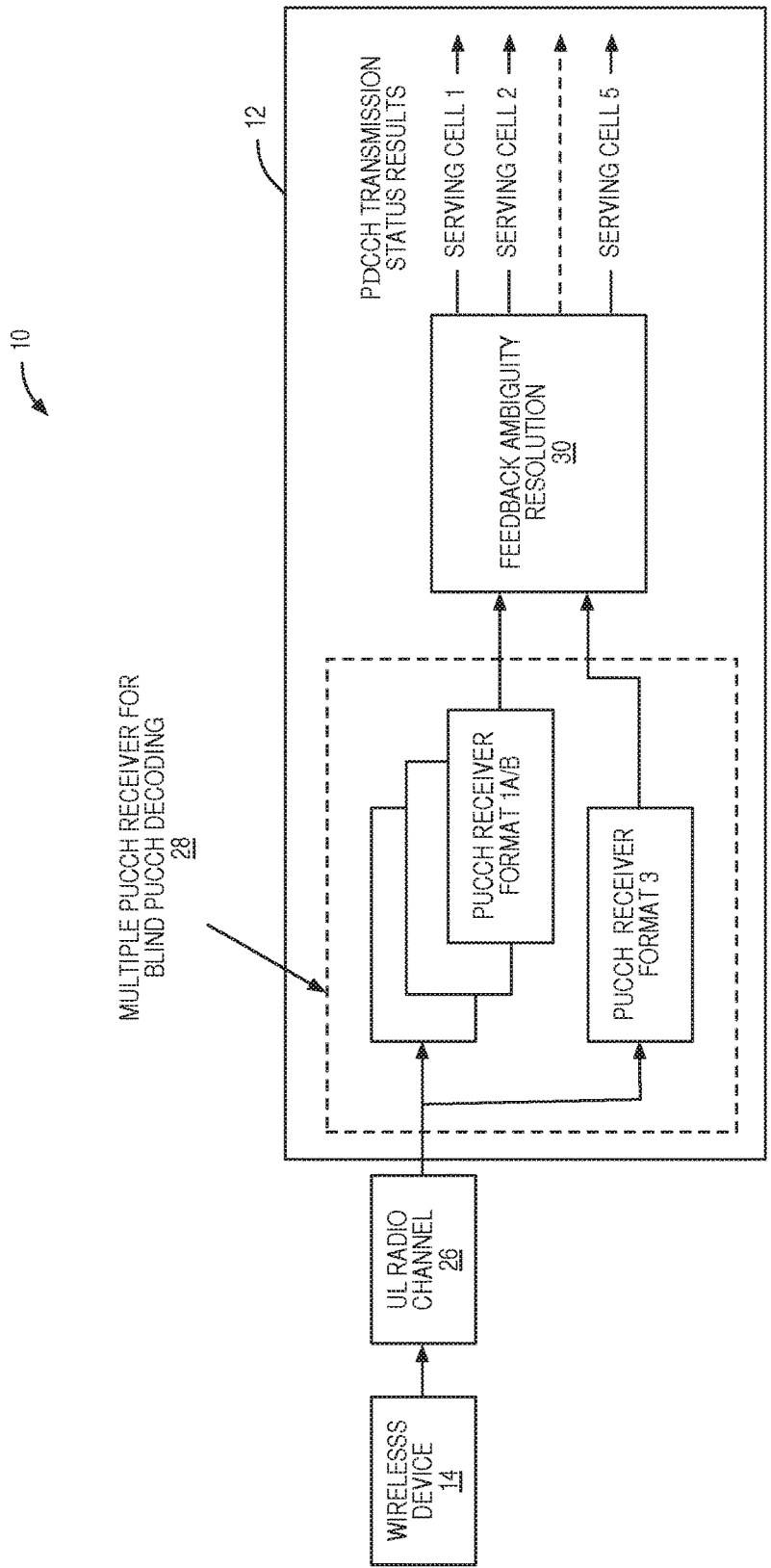
FIG. 4 is a diagram depicting a radio access node receiving and processing feedback from a wireless device according to some embodiments of the present disclosure.

As one example of how the radio access node 12 may concurrently operate multiple PUCCH receivers as in step 204, FIG. 4 is a diagram depicting a radio access node 12 receiving and processing feedback from a wireless device 14 according to some embodiments of the present disclosure. The wireless device 14 communicates with the radio access node 12 via the uplink radio channel 26 which is the medium through which radio signals corresponding to an uplink transmission propagate from the wireless device 14 to the radio access node 12. As shown in FIG. 4, the radio access node 12 contains multiple PUCCH receivers 28 that can be operated concurrently for blind PUCCH decoding. As used herein, blind PUCCH decoding means that the radio access node 12 may be able to decode a PUCCH message without knowing the format of the message. The results from the multiple PUCCH receivers 28 are then input into the HARQ feedback ambiguity resolution block 30. This block may replace or work with the PDCCH transmission status determination block 24 in FIG. 1. Using the results from the multiple PUCCH receivers 28, the HARQ feedback ambiguity resolution block 30 determines a transmission status of the PDCCH messages for each of the serving cells. Note that while FIG. 4 shows five serving cells, this disclosure is not limited thereto. The transmission status for each serving cell will be either a successful transmission, a failed transmission, or an unknown transmission status.

As an example of how the HARQ feedback ambiguity resolution block 30 determines a transmission status of the PDCCH messages for each of the serving cells, the following scenarios are described. Note that these are merely examples and the HARQ feedback ambiguity resolution block 30 is not limited to these examples. In the discussions below, the radio access node 12 optionally concurrently operates a format 3 PUCCH receiver and format 1a/b PUCCH receivers. If the energy detected by the format 1a/b PUCCH receiver is below P_threshold_f1 and the wireless device 14 is supposed to send feedback with format 1a/b; this is considered a DTX. Similarly, if the energy detected by the format 3 PUCCH receiver is below P_threshold_f3 and the wireless device 14 is supposed to send feedback with format 3, this is considered a DTX.

Scenario 1: Only the PCell is transmitting data. In this scenario, the format 3 PUCCH receiver may be stopped in some embodiments in order to save processing resources at the radio access node 12 as the wireless device 14 is not supposed to send feedback with PUCCH format 3 with DL data only on PCell. The PDCCH transmission status results are unambiguous:

| PUCCH format 1a/b detection results on radio access node 12 | PUCCH format 3 decoding results on radio access node 12 | PDCCH transmission status results PCell |
|---|---|---|
| Energy < P_threshold_f1 | N/A | Fail |
| PUCCH format 1a/b detection success | N/A | Success |

Scenario 2: Only 1 SCell is transmitting data. In this scenario, the format 1a/b PUCCH receiver may be stopped in some embodiments in order to save processing resources at the radio access node 12 as the wireless device 14 is not supposed to send feedback with format 1a/b. The PDCCH transmission status results are unambiguous:

| PUCCH format 1a/b detection results on radio access node 12 | PUCCH format 3 decoding results on radio access node 12 | PDCCH transmission status results SCell |
|---|---|---|
| N/A | Energy < P_threshold_f3 | Fail |
| N/A | PUCCH format 3 detection success | Success |

Scenario 3: One PCell and one SCell are transmitting data. All PUCCH receivers should be running. The PDCCH transmission status on SCell is unambiguous. For PCell, when the format 3 receiver detected all NACK, the PDCCH transmission status is unknown: i.e. it could be that the PCell received the PDCCH successfully but failed to detect the corresponding PDSCH or the PCell failed to receive the PDCCH. Due to this unknown state, the PCell's PDCCH transmission status is not always unambiguous, thus the LA outer loop on the PCell will not be updated:

| PUCCH format 1a/b detection results on radio access node 12 | PUCCH format 3 decoding results on radio access node 12 | PDCCH transmission status results PCell | PDCCH transmission status results SCell |
|---|---|---|---|
| Energy < P_threshold_f1 | Energy < P_threshold_f3 | Fail | Fail |
| PUCCH format 1a/b detection success | Energy < P_threshold_f3 | Success | Fail |
| Energy < P_threshold_f1 | PCell At least one ACK detected | SCell Either ACK or NACK detected | Success | Success |
| Energy < P_threshold_f1 | All NACK detected | Either ACK or NACK detected | Unknown | Success |

Scenario 4: One PCell, two or more SCells are transmitting data. In this scenario, both the PCell and the SCells have unknown transmission statuses thus the PDCCH LA outer loops on PCell and SCell will not be updated:

| PUCCH format 1a/b detection results on radio access node 12 | PUCCH format 3 decoding results on radio access node 12 | PDCCH transmission status results PCell | PDCCH transmission status results on all SCells |
|---|---|---|---|
| Energy < P_threshold_f1 | Energy < P_threshold_f3 | Fail | Fail |
| PUCCH format 1a/b detection success | Energy < P_threshold_f3 | Success | Fail |
| Energy < P_threshold_f1 | PCell At least one ACK detected | SCells At least one ACK detected | Success | Success for SCells with at least one ACK detected, unknown for SCells with all NACKs |
| Energy < P_threshold_f1 | All NACK detected | All NACK detected | Unknown | Unknown |

Scenario 5: Two or more SCells are transmitting data. In this scenario, format 1a/b PUCCH receiver may be stopped in some embodiments in order to save processing resources at the radio access node 12 as the wireless device 14 is not supposed to send feedback with format 1a/b. The PDCCH transmission statuses on SCells are not unambiguous and the PDCCH LA outer loops will not be updated:

| PUCCH format 1a/b detection results on radio access node 12 | PUCCH format 3 decoding results on radio access node 12 | PDCCH transmission status results PCell | PDCCH transmission status results on all SCells |
|---|---|---|---|
| N/A | Energy < P_threshold_f3 | N/A | Fail |
| N/A | At least one ACK detected | N/A | Success for the SCells with at least one ACK detected. Unknown for others |
| N/A | All NACK detected | N/A | Unknown |

Figure 5:
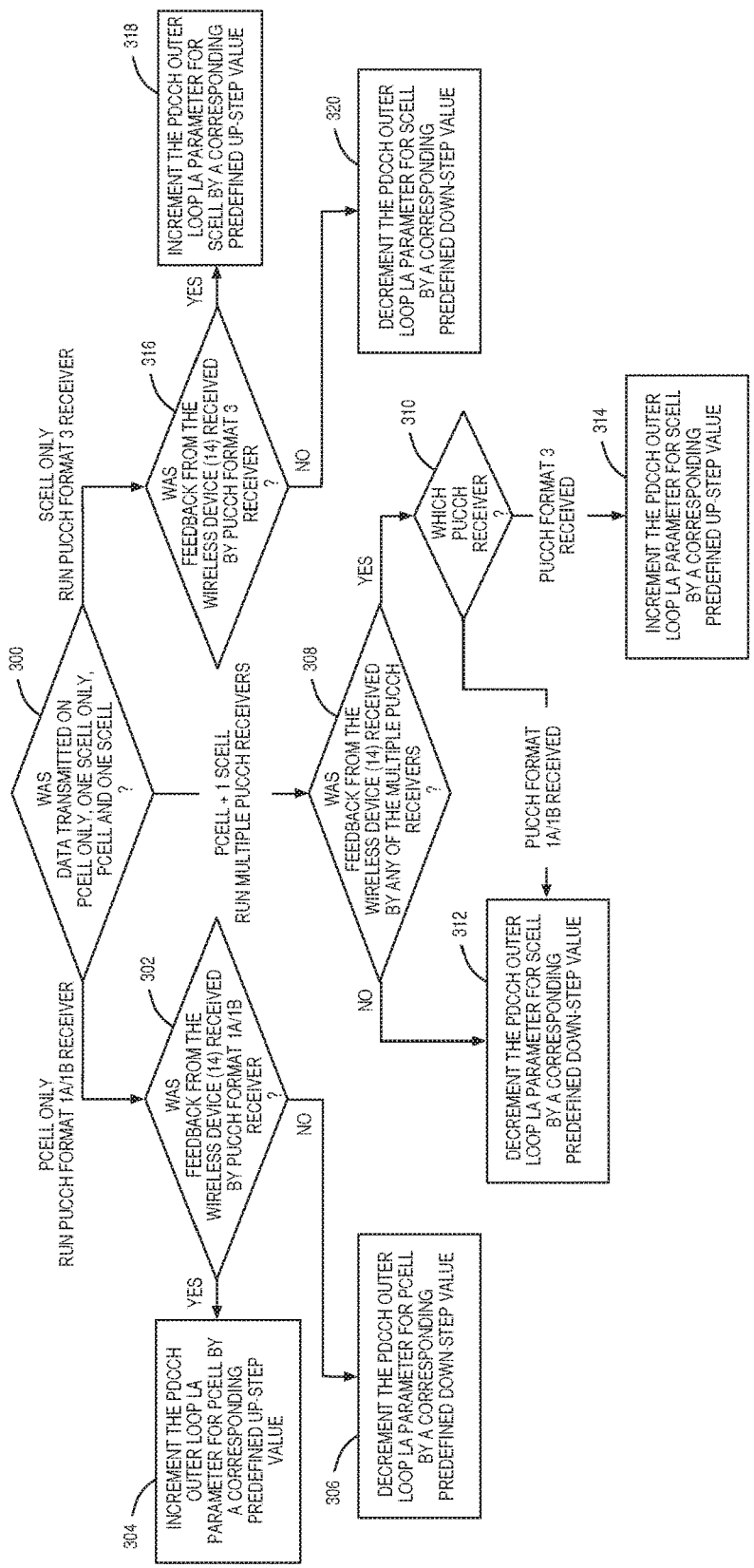
FIG. 5 illustrates a process for performing a control channel outer loop adjustment for link adaptation using the PUCCH receivers of FIG. 4 according to some embodiments of the present disclosure.

For scenarios with guaranteed unambiguous PDCCH transmission status on a serving cell, once the transmission status of a PDCCH message is known, the control channel outer loop LA parameter for the PDCCH on that serving cell can be updated. FIG. 5 illustrates a process for performing a control channel outer loop adjustment for LA using the PUCCH receivers of FIG. 4 according to some embodiments of the present disclosure. First, on the TTI that HARQ feedback is expected from the wireless device 14, the radio access node 12 starts the proper PUCCH receivers and checks if feedback from the wireless device 14 was received by any of the multiple PUCCH receivers. The radio access node 12 determines whether data was transmitted on the PCell only, one SCell only, or the PCell and only one SCell (step 300). If the data was transmitted on the PCell only, then only the format 1a/b PUCCH receiver needs to run. The radio access node 12 then determines if feedback from the wireless device 14 was received by the PUCCH format 1a/b receiver (step 302). If feedback from the wireless device 14 was received by the PUCCH format 1a/ab receiver, the radio access node 12 increments the outer loop LA parameter for the PDCCH of the PCell by a corresponding predefined up-step value (step 304). If feedback from the wireless device 14 was not received by the PUCCH format 1 a/b receiver, the radio access node 12 decrements the outer loop LA parameter for the PDCCH of the PCell by a corresponding predefined down-step value (step 306).

If the data was transmitted on PCell and one SCell only, then the format 1a/b PUCCH receiver and the format 3 PUCCH receiver need to run. The radio access node 12 then determines if feedback from the wireless device 14 was received by any of the multiple PUCCH receivers (step 308). If feedback from the wireless device 14 was received, the radio access node 12 determines which PUCCH receiver received the feedback (step 310). If feedback from the wireless device 14 was received by the PUCCH format 1a/b receiver, the radio access node 12 decrements the outer loop LA parameter for the PDCCH of SCell by a corresponding predefined down-step value (step 312). If feedback from the wireless device 14 was received by the PUCCH format 3 receiver, the radio access node 12 increments the outer loop LA parameter for the PDCCH of the SCell by a corresponding predefined up-step value (step 314).

If the data was transmitted on the SCell only, then only the format 3 PUCCH receiver needs to run. The radio access node 12 then determines if feedback from the wireless device 14 was received by the PUCCH format 3 receiver (step 316). If feedback from the wireless device 14 was received by the PUCCH format 3 receiver, the radio access node 12 increments the outer loop LA parameter for the PDCCH of the SCell by a corresponding predefined up-step value (step 318). If feedback from the wireless device 14 was not received by the PUCCH format 3 receiver, the radio access node 12 decrements the outer loop LA parameter for the PDCCH of the SCell by a corresponding predefined down-step value (step 320).

Figure 6:
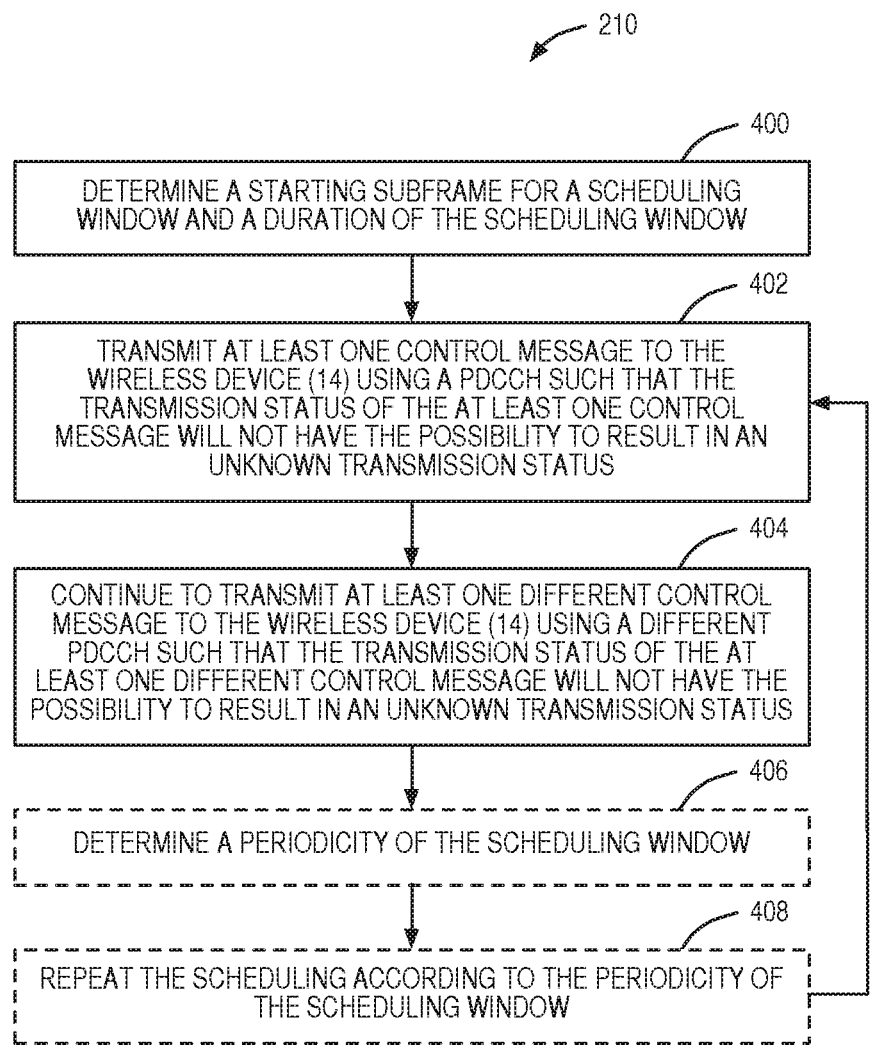
FIG. 6 illustrates a process for transmitting at least one control message to a wireless device such that the transmission status of the at least one control message is never an unknown transmission status according to some embodiments of the present disclosure.

For data transmissions whose PDCCH transmission status may result in an unknown status, the radio access node 12 refrains from updating the outer loop LA parameter for the PDCCH. Note that, in some embodiments, the up-step and down-step value may not be predefined, but may be calculated. As previously discussed, in some embodiments, when the radio access node 12 is unable to update the outer loop LA parameter for a PDCCH for a prolonged period of time, the radio access node 12 may not be able to operate in the most efficient way. There may be times when it may be desirable to schedule downlink data transmissions in such a way that the outer loop LA parameters for the multiple PDCCHs may be updated. As such, FIG. 6 illustrates a process for transmitting at least one control message to a wireless device 14 such that the transmission status of the at least one control message will not have the possibility to result in an unknown transmission status according to some embodiments of the present disclosure. In these embodiments, the scheduling to avoid an unknown transmission status is done periodically for one or more of the PDCCHs. First, the radio access node 12 determines a starting subframe for a scheduling window and a duration of the scheduling window (step 400). The radio access node 12 then transmits at least one control message to the wireless device 14 using a PDCCH such that the transmission status of the at least one control message will not have the possibility to result in an unknown transmission status (step 402). This may be accomplished by using one of the combinations outlined above that guarantees unambiguous feedback for the at least one PDCCH. The radio access node 12 then continues to transmit at least one different control message to the wireless device 14 using a different PDCCH on a different serving cell such that the transmission status of the at least one different control message will not have the possibility to result in an unknown transmission status (step 404). In some embodiments, unambiguous feedback for the PDCCH for each of the serving cells is obtained.

In some embodiments, the scheduling window is a mutually exclusive scheduling window. In this window, the PCell is guaranteed to have one subframe in which only the PCell is scheduled data. Each serving SCell is also guaranteed to have one subframe of the scheduling window in which only that serving SCell is scheduled data possibly along with the PCell. This can be achieved by only assigning the wireless device 14 data to the respective serving cell(s) while keeping the data buffers of wireless device 14 in the other serving cells at zero. This will guarantee that each serving cell will generate unambiguous feedback on PDCCH transmission status at least once in this scheduling window. In some embodiments, additional downlink throughput can be achieved compared with the conventional way of dealing with PDCCH transmission status ambiguity when the serving cells to be scheduled are one PCell and one SCell. This is because, as discussed in Scenario 3 above, when there are only two downlink transmissions, one on the PCell and one on an SCell, the PDCCH transmission status for the SCell will be unambiguous.

Figure 7:
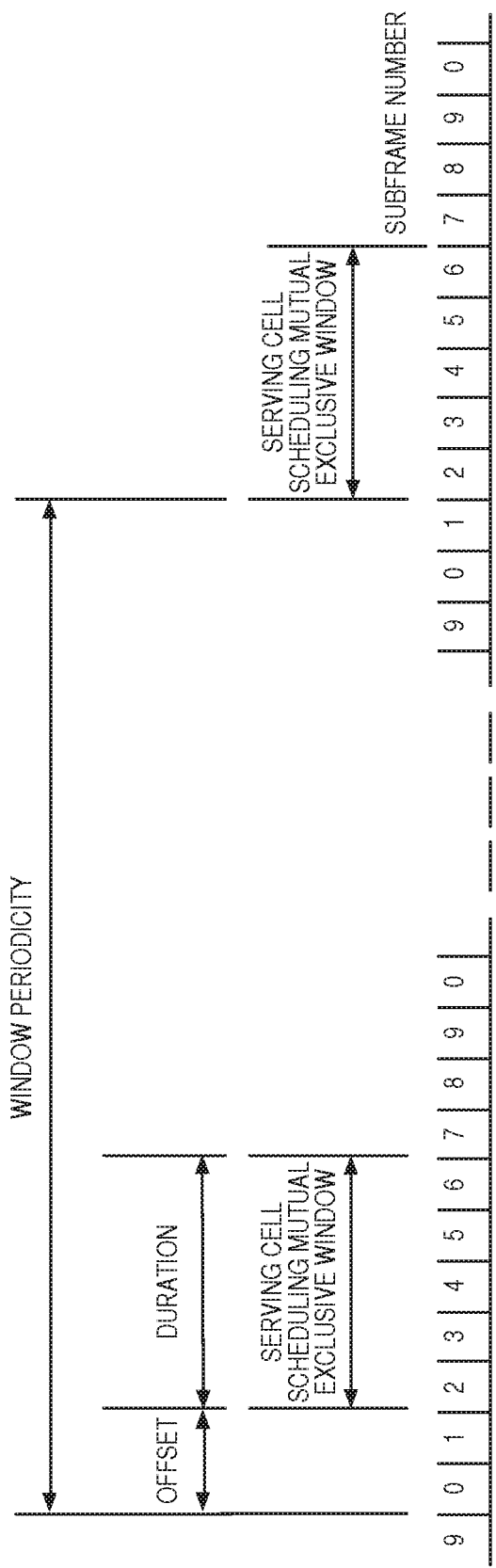
FIG. 7 illustrates an exemplary scheduling window for use with the process of FIG. 6 according to some embodiments of the present disclosure.

Returning to FIG. 6, the radio access node 12 then optionally determines a periodicity of the scheduling window (step 406) and repeats the scheduling according to the periodicity of the scheduling window (step 408). For instance, FIG. 7 illustrates an exemplary scheduling window for use with the process of FIG. 6 according to some embodiments of the present disclosure. In this case, the starting subframe of the scheduling window is determined by the offset from the starting subframe. As illustrated in FIG. 7, the scheduling window starts at subframe 2, and the duration of the scheduling window is five subframes long. In this example, each of the five subframes of the scheduling window can be used to obtain unambiguous feedback for at least one of five serving cells. FIG. 7 also illustrates the optional periodicity of the scheduling window where the scheduling is repeated. The periodicity of the scheduling window may be a design parameter to achieve a compromise between PDCCH LA outer loop performance and the throughput of the wireless device 14. A smaller periodicity will suffer more throughput loss but will generate more unambiguous HARQ feedbacks for PDCCH LA outer loop.

In some embodiments, the PDCCH LA outer loop will be updated any time a PDCCH transmission status is received for the PCell in Scenario 1 and the SCell in Scenarios 2 and 3. If the transmission conforms to Scenario 4 or Scenario 5, then neither the PCell nor the SCells' PDCCH LA outerloop will run during that period.

Figure 8:
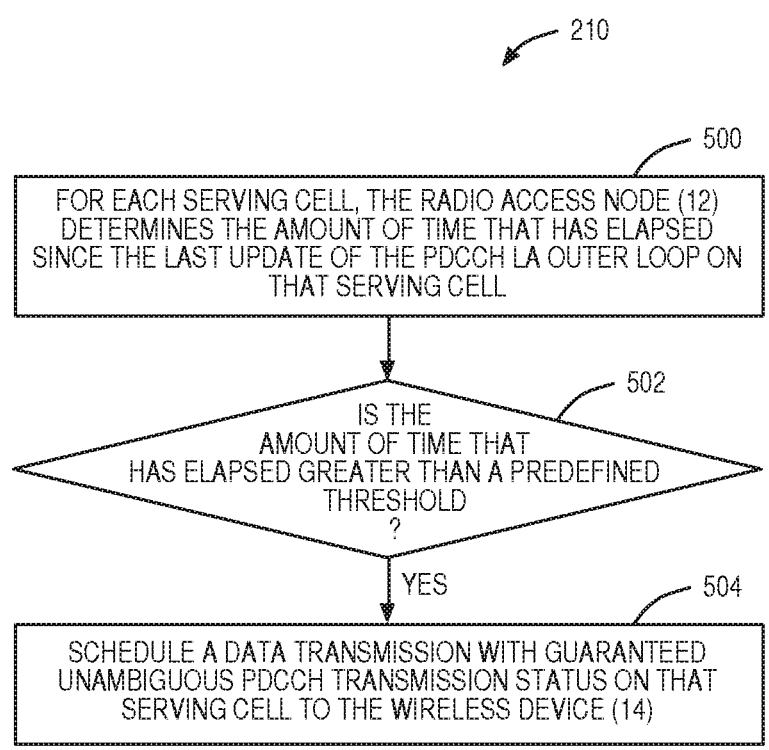
FIG. 8 illustrates another process for transmitting at least one control message to a wireless device such that the transmission status of the at least one control message is never an unknown transmission status according to some embodiments of the present disclosure.

In between these scheduling windows described above, PDCCH transmissions conforming to Scenarios 1, 2, and 3 may happen naturally. Then it is not necessary in the next scheduling window to restrict the scheduler to produce PDCCH transmissions that conform to the scenarios that have already happened. When Scenarios 1, 2, and 3 happen naturally, the method described in FIG. 6 may reduce the downlink throughput to the wireless device 14 in an undesirable way. This leads to another way to address the problem of ensuring unambiguous feedback for each of the serving cells which is illustrated in FIG. 8. This figure illustrates another process for transmitting at least one control message to the wireless device 14 such that the transmission status of the at least one control message will not have the possibility to result in an unknown transmission status according to some embodiments of the present disclosure. For each serving cell, the radio access node 12 determines the amount of time that has elapsed since the last update of the PDCCH LA outer loop on that serving cell (step 500). If the amount of time that has elapsed is greater than a predefined threshold (step 502), the radio access node 12 schedules a data transmission with guaranteed unambiguous PDCCH transmission status on that serving cell to the wireless device 14 (step 504). In some embodiments, this can be accomplished by having a timer, such as Elapsed_time_since_last_pdcch_outer_loop_update, defined for each serving cell. The timer is reset each time a PDCCH LA outer loop is updated on that serving cell. When the timer exceeds a threshold, such as Elapsed_time_threshold, if the serving cell is the PCell, then only the PCell will be scheduled data in order to guarantee an unambiguous transmission status. If the serving cell is a SCell, it will be the only SCell that will be scheduled data in order to guarantee an unambiguous transmission status on that SCell. In this way, the data throughput of the wireless device 14 may not be as adversely affected as in the method described in FIG. 6 since one or more of the serving cells may already have had data transmissions that conform to Scenarios 1, 2 or 3 as a result of normal scheduler decisions based on a combination of conditions of each serving cell and the amount of data in the data buffer. There is no need to put artificial restrictions on the scheduler for the purpose of PDCCH LA outer loop operation. The radio access node 12 can maximize the data throughput by scheduling on as many serving cells as possible in a TTI.

Figure 9:
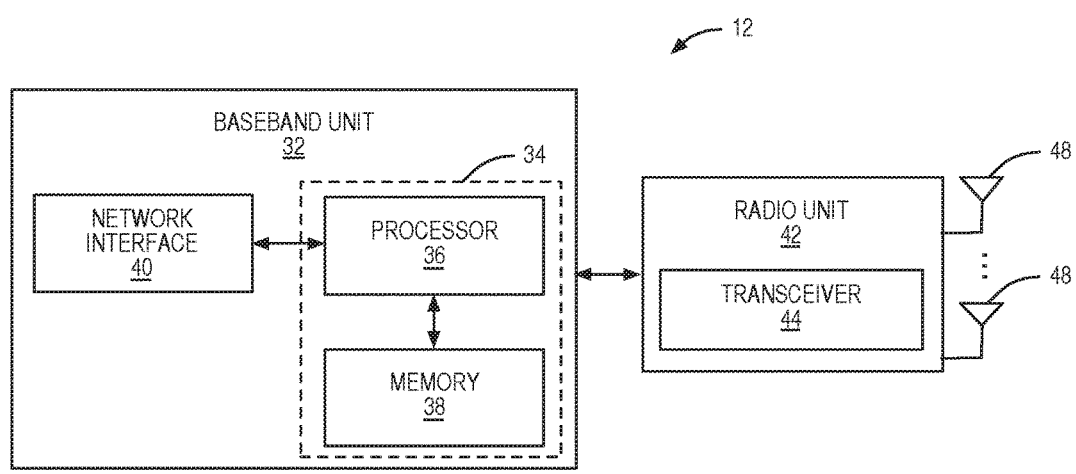
FIG. 9 is a block diagram of a radio access node according to some embodiments of the present disclosure.

FIG. 9 is a block diagram of a radio access node 12 according to some embodiments of the present disclosure. In some embodiments, the radio access node 12 includes a baseband unit 32 that includes circuitry 34 containing instructions, which when executed, cause the radio access node 12 to implement the methods and functionality described here. In one example, the circuitry 34 can be in the form of processing means which may include one or more processors 36 and a memory 38 containing instructions. As illustrated, the radio access node 12 also includes a network interface 40. As illustrated, the radio access node 12 also includes a radio unit 42 with a transceiver 44 and one or more antennas 48. In some embodiments, the radio access node 12, or the functionality of the radio access node 12 described with respect to any one of the embodiments described herein, is implemented in software that is stored in, e.g., the memory 38 and executed by the processor 36. The network interface 40 may include one or more components (e.g., network interface card(s)) that connect the radio access node 12 to other systems.

In some embodiments, a computer program including instructions which, when executed by the at least one processor 36, cause the at least one processor 36 to carry out the functionality of the radio access node 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 38).

Figure 10:
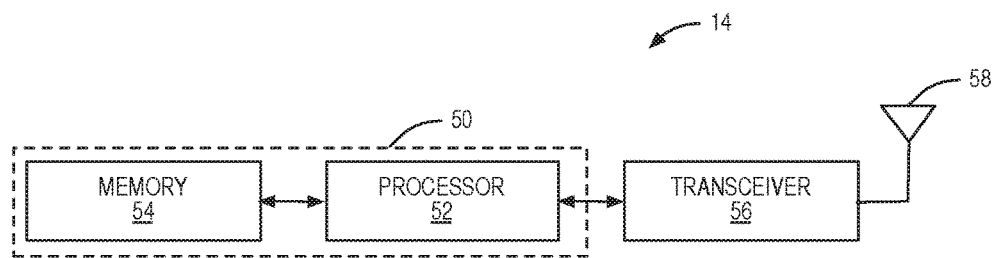
FIG. 10 is a block diagram of a wireless device according to some embodiments of the present disclosure.

FIG. 10 is a block diagram of a wireless device 14 according to some embodiments of the present disclosure. As illustrated, the wireless device 14 includes circuitry 50 containing instructions, which when executed, cause the wireless device 14 to implement the methods and functionality described here. In one example, the circuitry 50 can be in the form of processing means which may include at least one processor 52 and memory 54. The wireless device 14 also includes a transceiver 56 and at least one antenna 58. In some embodiments, wireless device 14, or the functionality of the wireless device 14 described with respect to any one of the embodiments described herein, is implemented in software that is stored in, e.g., the memory 54 and executed by the processor 52. The transceiver 56 uses the at least one antenna 58 to transmit and receive signals and may include one or more components that connect the wireless device 14 to other systems.

In some embodiments, a computer program including instructions which, when executed by at least one processor 52, cause the at least one processor 52 to carry out the functionality of the wireless device 14 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 54).

Figure 11:
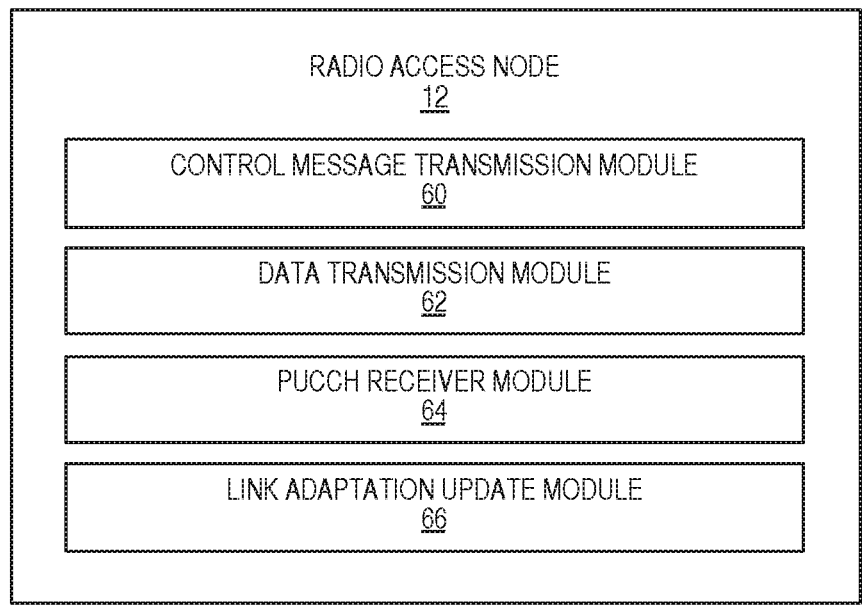
FIG. 11 is a block diagram of a radio access node including a control channel transmission module, a data transmission module, a Physical Uplink Control Channel (PUCCH) receiver module, and a link adaptation update module according to some embodiments of the present disclosure.

FIG. 11 is a block diagram of a radio access node 12 including a control message transmission module 60, a data transmission module 62, a PUCCH receiver module 64, and a LA update module 66 according to some embodiments of the present disclosure.

The control message transmission module 60, the data transmission module 62, the PUCCH receiver module 64, and the LA update module 66 are each implemented in software that, when executed by a processor 36 of the radio access node 12, causes the radio access node 12 to operate according to one of the embodiments described herein. The control message transmission module 60 operates to transmit control messages to a wireless device 14 via corresponding PDCCHs associated with corresponding serving cells, informing the wireless device 14 of corresponding data transmissions to be transmitted to the wireless device 14, as described above with respect to the steps 100 and 200. The data transmission module 62 operates to transmit the data transmissions to the wireless device 14 via PDSCHs associated with the corresponding serving cells as discussed above with respect to, for example, steps 102 and 202. The PUCCH receiver module 64 operates to concurrently operate multiple PUCCH receivers on one serving cell during a TTI during which feedback from the wireless device 14 indicative of reception of the data transmissions is expected, where each PUCCH receiver is capable of receiving a different format PUCCH message if necessary and to determine the transmission status of each of the plurality of PDCCH transmissions based on the decoding results of the plurality of PUCCH receivers as discussed above with respect to, for example, steps 204 and 206. The LA update module 66 operates to update an outer loop LA parameter for each of the PDCCHs based on an output from the PUCCH receivers as discussed above with respect to, for example, steps 110 and 208.

The following acronyms are used throughout this disclosure.

3G 3$^{rd}$ Generation
3GPP 3$^{rd}$ Generation Partnership Project
4G 4$^{th}$ Generation
5G 5$^{th}$ Generation
ACK Acknowledgement
BLER Block Error Rate
CA Carrier Aggregation
CC Component Carrier
CCE Control Channel Elements
CQI Channel Quality Indicator
CS Channel Selection
DCI Downlink Control Information
DL Downlink
DTX Discontinuous Transmission
eNB Evolved (or Enhanced) Node B FDD Frequency Division Duplexing
HARQ Hybrid Automatic Repeat Request
LA Link Adaptation
LTE Long Term Evolution
LTE-A Long Term Evolution Advanced
NACK Negative Acknowledgement
OL_ADJ_DL Outer Loop Adjustment
PCell Primary Cell
PDCCH Physical Downlink Control Channel
PDSCH Physical Downlink Shared Channel
PUCCH Physical Uplink Control Channel
PUSCH Physical Uplink Shared Channel
RRC Radio Resource Control
SCC Secondary Component Carrier
SCell Secondary Cell
SINR Signal-to-Interference-and-Noise Ratio
TB Transport Block
TDD Time Division Duplexing
TTI Transmit Time Interval
UE User Equipment
UL Uplink
UMTS Universal Mobile Telecommunications System
VOIP Voice over Internet Protocol
VoLTE Voice over LTE
WiMAX Worldwide Interoperability for Microwave Access Those skilled in the art will recognize improvements and modifications to the embodiments of the present disclosure. All such improvements and modifications are considered within the scope of the concepts disclosed herein and the claims that follow.

What is claimed is:

1. A method of operation of a radio access node in a cellular communications network to provide Physical Downlink Control Channel, PDCCH, Link Adaptation, LA, by enabling the operation of a PDCCH LA outer loop based on PDCCH transmission status, when serving a wireless device according to a carrier aggregation scheme, comprising:
    transmitting a plurality of control messages to the wireless device via a corresponding plurality of PDCCHs associated with a corresponding plurality of serving cells of the wireless device, the plurality of control messages informing the wireless device of a corresponding plurality of data transmissions to be transmitted to the wireless device;
    transmitting the plurality of data transmissions to the wireless device via a plurality of Physical Downlink Shared Channels, PDSCHs, of the corresponding plurality of serving cells;
    concurrently operating a plurality of Physical Uplink Control Channel, PUCCH, receivers on one serving cell of the plurality of serving cells during a Transmit Time Interval, TTI, during which feedback from the wireless device indicative of reception of the plurality of data transmissions is expected, where each PUCCH receiver of the plurality of PUCCH receivers is capable of receiving a different format PUCCH message if necessary;
    determining the transmission status of each of the plurality of PDCCH transmissions based on decoding results of the plurality of PUCCH receivers; and
    updating an outer loop LA parameter for each of the plurality of PDCCHs based on the determined PDCCH transmission status.

2. The method of claim 1 wherein transmitting the plurality of data transmissions to the wireless device via the plurality of PDSCHs associated with the corresponding plurality of serving cells comprises transmitting the plurality of data transmissions in the same TTI.

3. The method of claim 1 wherein the plurality of serving cells comprises a Primary Cell, PCell, and at least one Secondary Cell, SCell, and determining the transmission status of each of the plurality of PDCCH transmissions comprises:
    if none of the plurality of PUCCH receivers received feedback from the wireless device indicative of reception of any of the plurality of data transmissions, the plurality of PDCCH transmissions all will have a status of fail;
    if the PUCCH format 1a/b receiver received feedback from the wireless device indicative of reception of data transmission on the PCell but a PUCCH format 3 receiver received no feedback from the wireless device indicative of reception of data transmission on the at least one SCell, the PDCCH transmission on PCell will have a status of success, and the PDCCH transmissions on the at least one SCell will have status of fail;
    if the PUCCH format 3 receiver received feedback from the wireless device indicative of reception of data transmission on at least one of the at least one SCell, the serving cells on which at least one Acknowledgement, ACK, was received will have the PDCCH transmission status on those serving cells as success and the serving cells on which all NACK were received will have the PDCCH transmission status on those serving cells as unknown with the exception that if there was only one SCell among the serving cells transmitting data, the PDCCH transmission status on that SCell will have a status of success.

4. The method of claim 1 wherein the plurality of serving cells comprises a Primary Cell, PCell, and at least one Secondary Cell, SCell, and updating the outer loop LA parameter for each of the plurality of PDCCHs comprises:
    determining that the serving cells on which data transmissions occurred to wireless device are either, PCell only, one SCell only or PCell with one SCell;
    in response to determining that data transmissions to wireless device occurred only on PCell, the PCell's PDCCH LA outer loop parameter will be updated based on its PDCCH transmission status;
    in response to determining that data transmissions to wireless device occurred only on one SCell of the at least one SCell, the SCell's PDCCH LA outer loop parameter will be updated based on its PDCCH transmission status;
    in response to determining that data transmissions to wireless device occurred on PCell and one SCell of the at least one SCell, the SCell's PDCCH LA outer loop parameter will be updated based on its PDCCH transmission status, and the PCell's PDCCH LA outer loop parameter will be refrained from updating; and
    in response to determining that data transmissions to wireless device occurred on different serving cell configurations other than indicated above, all serving cells' PDCCH LA outer loop parameters will be refrained from updating.

5. The method of claim 4 wherein updating the outer loop LA parameter for PCell PDCCH in response to determining that data transmissions occurred only on PCell to wireless device comprises:
    only operating a PUCCH format 1a/b receiver;
    decrementing the outer loop LA parameter for the PCell's PDCCH by a corresponding predefined down-step value if no feedback from wireless device was received on the PUCCH format 1a/b receiver; and incrementing the outer loop LA parameter for the PCell's PDCCH by a corresponding predefined up-step value if feedback from wireless device was received on PUCCH format 1a/b receiver.

6. The method of claim 4 wherein updating the outer loop LA parameter for the SCell PDCCH in response to determining that data transmission occurred only on one SCell to wireless device comprises:

only operating a PUCCH format 3 receiver;

decrementing the outer loop LA parameter for the SCell's PDCCH by a corresponding predefined down-step value if no feedback from wireless device was received on the PUCCH format 3 receiver; and incrementing the outer loop LA parameter for the SCell's PDCCH by a corresponding predefined up-step value if feedback from wireless device was received on the PUCCH format 3 receiver.

7. The method of claim 4 wherein updating the outer loop LA parameter for the SCell PDCCH in response to determining that data transmission occurred on the PCell and on only one SCell to wireless device comprises:

concurrently operating a plurality of PUCCH receivers capable of either decoding a PUCCH format 1A/1B message or a PUCCH format 3 message;

decrementing the outer loop LA parameter for the SCell's PDCCH by a corresponding predefined down-step value if none of the plurality of PUCCH receivers received feedback from wireless device or feedback was received on the PUCCH format 1a/b receiver; and incrementing the outer loop LA parameter for the SCell's PDCCH by a corresponding predefined up-step value if feedback from wireless device was received on PUCCH format 3 receiver.

8. The method of claim 1 further comprising:

transmitting at least one control message to the wireless device via one of the plurality of PDCCHs such that the transmission status of the at least one control message is never an unknown transmission status.

9. The method of claim 8 wherein transmitting the at least one control message comprises:

determining a starting subframe for a scheduling window and a duration of the scheduling window;

beginning at the starting subframe of the scheduling window, transmitting at least one control message to the wireless device via one of the plurality of PDCCHs such that the transmission status of the at least one control message will not have the possibility to result in an unknown transmission status; and until the duration of the scheduling window has elapsed, continuing to transmit at least one different control message to the wireless device using a different PDCCH of the plurality of PDCCHs such that the transmission status of the at least one different control message will not have the possibility to result in an unknown transmission status.

10. The method of claim 9 wherein transmitting the at least one control message further comprises:

determining a periodicity of the scheduling window for scheduling the plurality of data transmissions; and repeating the transmitting step and the continuing to transmit step according to the periodicity of the scheduling window.

11. The method of claim 8 wherein transmitting the at least one control message comprises:

for each PDCCH of the plurality of PDCCHs:

determining an amount of time that has elapsed since the last update of the PDCCH LA outer loop; and if the amount of time that has elapsed is greater than a predefined threshold, transmitting a control message to the wireless device using the PDCCH such that the transmission status of the control message is never an unknown transmission status.

12. The method of claim 11 wherein the predefined threshold is chosen in order to balance the throughput of the data transmissions to the wireless device and a desired accuracy of the outer loop LA parameter.

13. The method of claim 8 wherein:

transmitting the at least one control message to the wireless device via one of the plurality of PDCCHs such that the transmission status of the at least one control message is never an unknown transmission status comprises transmitting only one control message to the wireless device informing the wireless device of a corresponding data transmission to be transmitted to the wireless device.

14. The method of claim 8 wherein only one of the at least one control message to the wireless device is on a secondary cell.

15. The method of claim 1 wherein the outer loop LA parameter is used to choose a Control Channel Element, CCE, aggregation level and/or a CCE power level for transmission of the control message to the wireless device using the corresponding PDCCH.

16. The method of claim 1 wherein each of the plurality of control messages comprises a Downlink Control Information, DCI.

17. The method of claim 1 wherein the plurality of serving cells comprises a plurality of cells controlled by the radio access node such that each of the plurality of PDCCHs and the corresponding PDSCH are on a corresponding cell of the plurality of cells.

18. The method of claim 1 wherein at least one of the plurality of serving cells is a cell provided by a remote radio head controlled by the radio access node.

19. The method of claim 1 wherein the cellular communications network is a Long Term Evolution, LTE, network.

20. A radio access node adapted to:

transmit a plurality of control messages to a wireless device via a corresponding plurality of Physical Downlink Control Channels, PDCCHs, associated with a corresponding plurality of serving cells, informing the wireless device of a corresponding plurality of data transmissions to be transmitted to the wireless device;

transmit the plurality of data transmissions to the wireless device via a corresponding plurality of Physical Downlink Shared Channels, PDSCHs, associated with the corresponding plurality of serving cells;

concurrently operate a plurality of Physical Uplink Control Channel, PUCCH, receivers on one serving cell of the plurality of serving cells during a Transmit Time Interval, TTI, during which feedback from the wireless device indicative of reception of the plurality of data transmissions is expected, where each PUCCH receiver of the plurality of PUCCH receivers is capable of receiving a different format PUCCH message if necessary;

determine the transmission status of each of the plurality of PDCCH transmissions based on the decoding results of the plurality of PUCCH receivers; and update an outer loop Link Adaptation, LA, parameter for each of the plurality of PDCCHs based on the determined PDCCH transmission status.

21. A radio access node for use in a cellular communications network, comprising:
- at least one processor; and
- a memory coupled to the at least one processor, the memory containing instructions executable by the at least one processor whereby the radio access node is operative to:
  - transmit a plurality of control messages to a wireless device via a corresponding plurality of Physical Downlink Control Channels, PDCCHs, associated with a corresponding plurality of serving cells, informing the wireless device of a corresponding plurality of data transmissions to be transmitted to the wireless device;
  - transmit the plurality of data transmissions to the wireless device via a corresponding plurality of Physical Downlink Shared Channels, PDSCHs, associated with the corresponding plurality of serving cells;
  - concurrently operate a plurality of Physical Uplink Control Channel, PUCCH, receivers on one serving cell of the plurality of serving cells during a Transmit Time Interval, TTI, during which feedback from the wireless device indicative of reception of the plurality of data transmissions is expected, where each PUCCH receiver of the plurality of PUCCH receivers is capable of receiving a different format PUCCH message if necessary;
- determine a transmission status of each of the plurality of PDCCH transmissions based on decoding results of the plurality of PUCCH receivers; and
- update an outer loop Link Adaptation, LA, parameter for each of the plurality of PDCCHs based on the determined PDCCH transmission status.

* * * * *